April 20, 1926.
H. A. LAMPLUGH
1,581,931
CONSTRUCTION OF VEHICLE BODIES
Filed Nov. 13, 1923     4 Sheets-Sheet 1
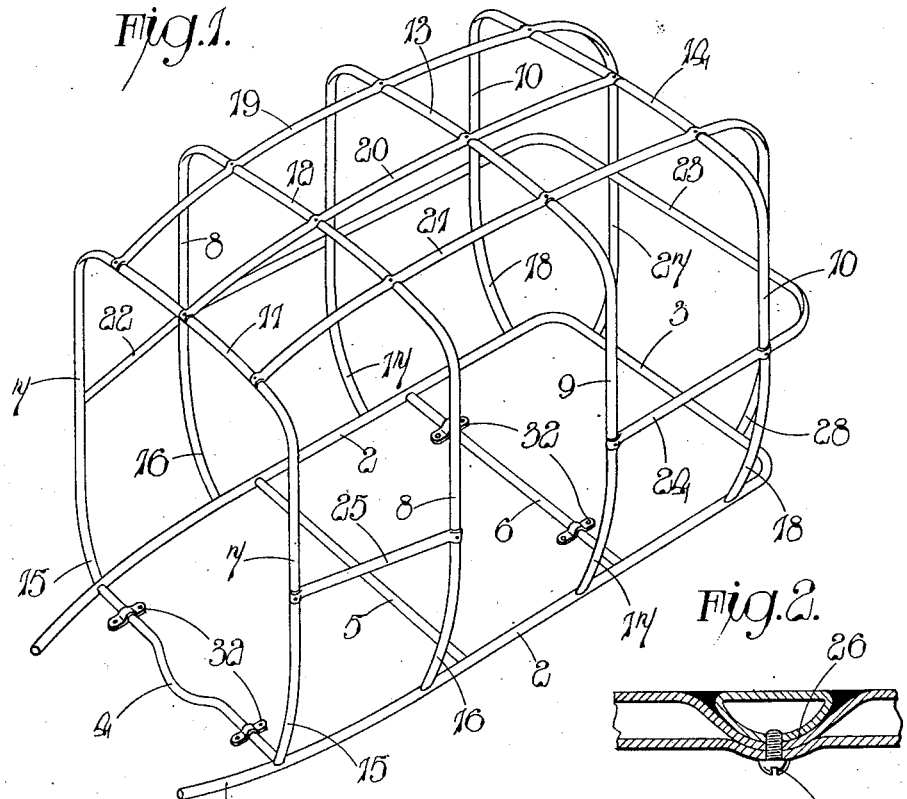
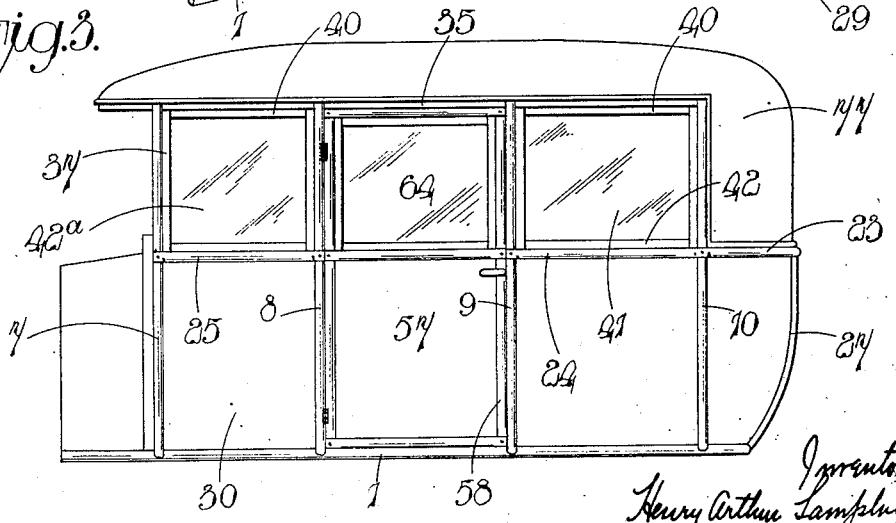

April 20, 1926.
H. A. LAMPLUGH
1,581,931
CONSTRUCTION OF VEHICLE BODIES
Filed Nov. 13, 1923    4 Sheets-Sheet 2
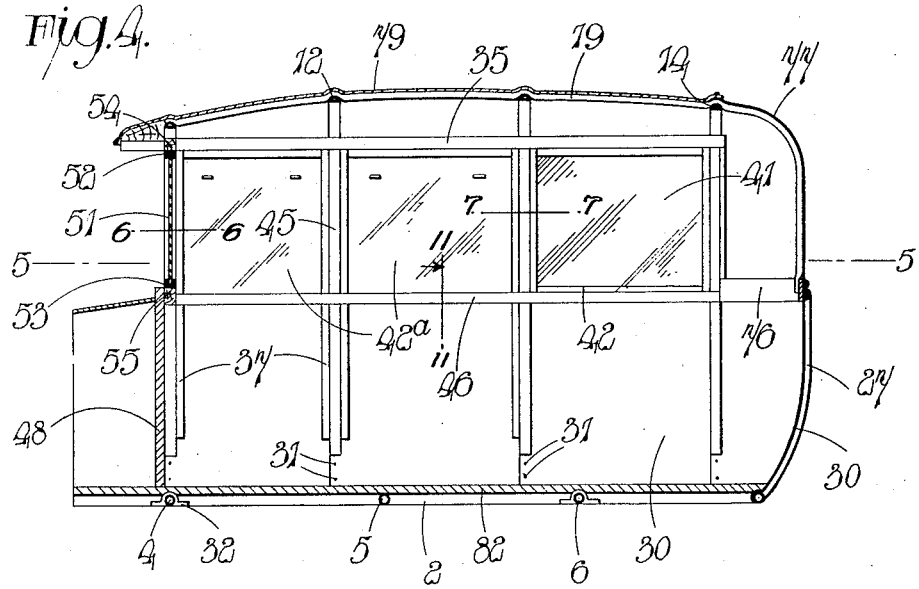
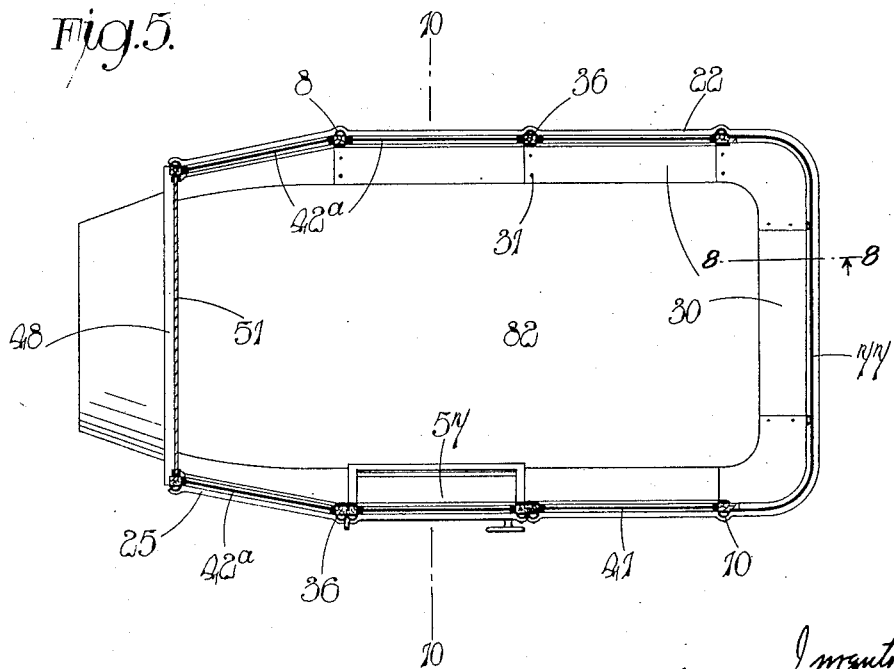

April 20, 1926.
H. A. LAMPLUGH
1,581,931
CONSTRUCTION OF VEHICLE BODIES
Filed Nov. 13, 1923    4 Sheets-Sheet 3
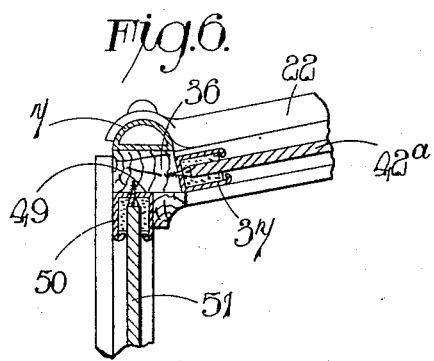
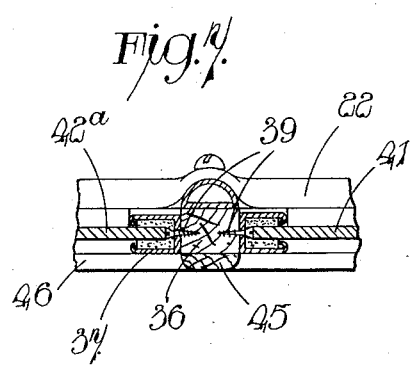
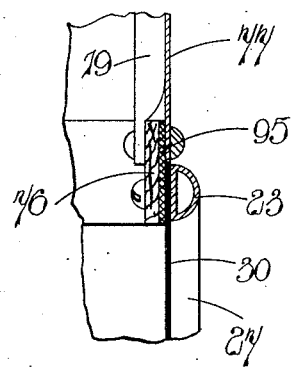
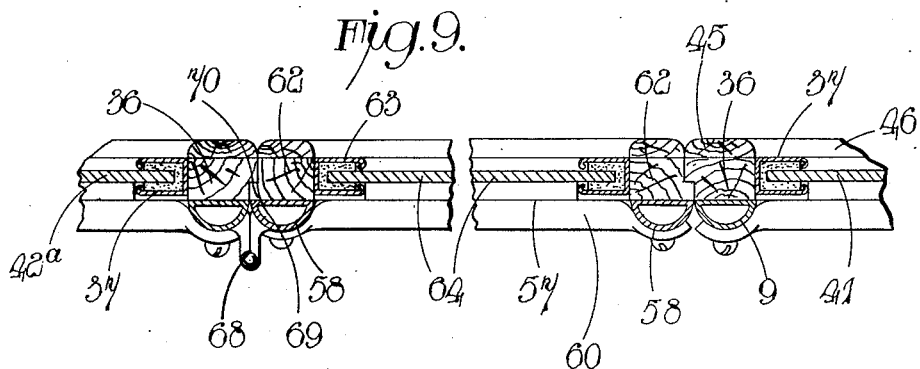

April 20, 1926.

H. A. LAMPLUGH 1,581,931

CONSTRUCTION OF VEHICLE BODIES

Filed Nov. 13, 1923     4 Sheets-Sheet 4

Patented Apr. 20, 1926.

1,581,931

UNITED STATES PATENT OFFICE.

HENRY ARTHUR LAMPLUGH, OF OLTON, ENGLAND.

CONSTRUCTION OF VEHICLE BODIES.

Application filed November 13, 1923. Serial No. 674,572.

*To all whom it may concern:*

Be it known that I, HENRY ARTHUR LAMPLUGH, a subject of the King of Great Britain, residing at St. Bernard's Road, Olton, in the county of Warwick, England, have invented certain new and useful Improvements in the Construction of Vehicle Bodies; and I do hereby declare the following to be a full, clear, and exact description of the same.

My invention comprises improvements in the construction of bodies for motor or other vehicles, and relates more particularly to bodies having frames constructed from lengths of tubing united together and while being particularly applicable to saloon or closed bodies, may be also used in connection with open bodies. The object of the invention is to provide a simple, cheap and light construction of body, particularly intended for use in connection with motor vehicles.

According to one feature of this invention, in constructing the tubular framework of a vehicle body, I employ a series of tubular members each bent to a substantially U shape and inverted so as to form the vertical members of the two sides and an integral transverse roof member, the lower ends of these vertical members being secured to a base frame, in combination with longitudinal horizontal members extending from front to back of the vehicle and welded to the U members at intervals.

According to another feature of this invention, where the one tube is jointed to another, one tube is "trapped" or so flattened and formed as to have a recess on its one side adapted to fit around the tube to which it is being jointed without leaving any substantial projection on either side of the untrapped tube, as would obtain if the tubes were merely bent. Preferably tubes of D section are used, and in practice the flat wall of the tube would be pressed down on to the interior of the curved wall so as to provide a D shaped recess on the flat side of the tube, and this recess would be arranged to embrace the curved wall of the tube, to which it is being jointed. This feature is equally applicable to saloon bodies or to open bodies.

Referring to the drawings:—

Figure 1 is a perspective view showing a saloon body framework according to this invention.

Figure 2 is a sectional view showing the method of joining two tubes of the framework cross one another substantially at right angles.

Figure 3 is an elevation of a finished body constructed according to this invention.

Figure 4 is a longitudinal sectional elevation.

Figure 5 is a sectional plan view on the line 5—5 in Figure 4.

Figure 6 is a sectional view on line 6—6 in Figure 4.

Figure 7 is a sectional view on line 7—7 in Figure 4.

Figure 8 is a sectional view on line 8—8 in Figure 5.

Figure 9 is an enlarged sectional plan view of sliding door and the doorway.

Figure 10:
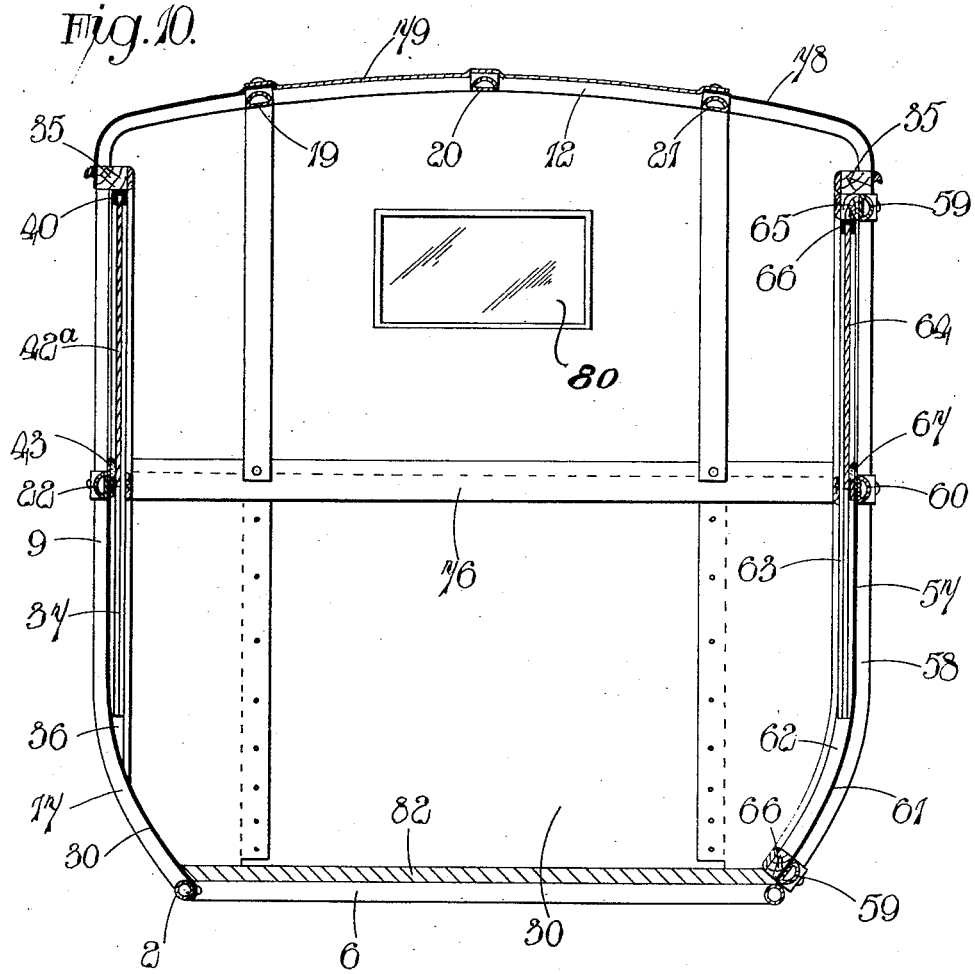
Figure 10 is a transverse section on the line 10—10 in Figure 5.

In the construction of saloon body illustrated upon the accompanying drawings, the base 1 of the body frame is built up of ordinary metal tubes (see Figure 1), a single tube being bent into substantially U shape, so that it has a portion 2 extending along one side, a portion 3 extending across the rear end and another portion 2 extending back along the other side of the base frame, a number of transverse tubes 4, 5 and 6 being provided at intervals along the length of the frame and welded in position.

The ends of the transverse tubes 4, 5 and 6 are shaped so as partially to embrace the base tube 1, before being welded into place. Two of the transverse tubes 4 and 6 are provided with attachment plates 32 secured thereto by welding and intended for securing the body to the car chassis.

Extending substantially vertically from the side members 2 of the base frame at intervals along its length, are tubes 7, 8, 9 and 10 of D section bent substantially to U shape and inverted, the lower extremities of these bent tubes 7, 8, 9 and 10 being secured to the base frame 1 by welding and the curved or middle portions 11, 12, 13 and 14 thereof forming part of the roof frame.

These tubes 7, 8, 9 and 10 have portions 15, 16, 17 and 18 curving outwardly from the side members 2 of the base frame, portions 7, 8, 9 and 10 extending vertically and then the substantially horizontal transverse portions 11, 12, 13 and 14.

Extending longitudinally from the upper transverse portion of the forward inverted U member are three substantially parallel tubes 19, 20 and 21 of similar section connected to each of the other transverse members 12, 13 and 14 and bent so as to conform to the required curvature of the roof, the two outer tubes 19 and 21 being bent downwardly at the rear end so as to extend about half way down the rear of the car, the central one 20 terminating at the transverse member 14.

The side and rear of the framework is divided into upper and lower portions by a horizontally disposed tube of similar D section having a portion 22 extending along one side, a portion 23 around the rear and a portion 24 part way along the other side of the framework and connected to each of the vertical members.

This portion 24 only extends forwardly as far as the vertical member 9, the space between the verticals 8 and 9 being used as a doorway. A separate piece of tubing 25 is provided between the verticals 7 and 8. A pair of vertical members 27 and 28 are provided extending between the rear portion 3 of the base frame 1 and the rear portion 23 of this intermediate horizontal member, to complete the rear of the framework.

These vertical members 7, 8, 9 and 10, longitudinal roof members 19, 20 and 21 and longitudinal side members 22 and 25 are all of D section tube, as shown in Figure 2, and are arranged with their flat sides facing inwardly. In order to connect the longitudinal tubes 19, 20, 21, 22 and 25 to each of the U shaped vertical members 7, 8, 9 and 10, the longitudinal tubes are partially flattened out or trapped at the required intervals, so as to provide recesses 26 of D shape corresponding with the section of tube to be joined (see Figure 2). These recesses 26 are adapted to fit closely around the outer arcuate sides of tubes 7, 8, 9 or 10 with which they are to be connected, the joints being then welded and if required also secured with set screws 29.

Instead of making each of the longitudinal members 19, 20, 21 and 22 all in one piece and providing them with the bent up junction portions 26, as described above, these longitudinal members may be made up in sections, each section extending between a pair of the U-shaped vertical members and being welded or otherwise secured thereto.

As previously mentioned, the side and rear framework is divided into upper and lower portions by a horizontally disposed tubular member comprising the portions 22, 23, 24 and 25 extending most of the way around the framework. The said lower portion is adapted to be closed, except for the door space, by sheet metal panels 30 formed to the required configuration and extending between adjacent pairs of vertical members (see Figures 4, 5 and 10).

These panels 30 are disposed upon the inside of the framework and the edges of adjacent panels are overlapped on the flat inner surface of the intermediate vertical members 8, 9, 10, 27 or 28, as the case may be, and secured thereto by set screws 31. The lower edges of the panels are bent so as to extend partly around the side and end portions 2 and 3 of the tubular base member and are secured thereto by further set screws (see Figure 10).

Towards the upper limit of the vertical portions 7, 8, 9 and 10 of the side frame members a horizontal wooden beam or strip 35 is secured on the inside of each side of the frame, extending between the front and rear vertical members 7 and 10 thereof.

These strips 35 are recessed at intervals, so that their outside faces are flush with the outside of the vertical members 7, 8, 9 and 10. Extending downwardly from these beams 35 and secured to each of the side frame members 7, 8, 9 and 10 are a series of straight wooden strips 36. These straight strips extend downwardly as far as the incurved portions 15, 16, 17 and 18 of the side members, the lower parts of the strips assisting in securing the sheet metal panels 30 against the side frame members 7, 8, 9 and 10.

To the edges of these vertical wooden strips 36 are secured channel members 37 lined with felt and adapted to serve as guides or frames for the sliding or fixed window panes respectively.

These channel members 37 are secured in position by wood screws 39 passing through the base of the channel into the wooden strip 36, as shown in Figure 7. Corresponding channel members 40 are secured on the lower face of the horizontal wooden beams 35 and are adapted to be engaged by the upper edges of the window panes.

If required, weather strips of leather or like material may be secured between the various channel members and the members to which they are secured, in order to ensure water tightness at these points. Similar weather strips or filling may be provided at all points where rain might possibly leak into the body.

Figure 11:
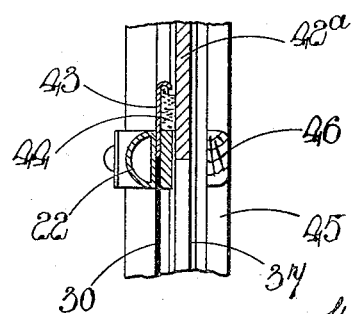
Figure 11 is a sectional view on line 11—11 in Figure 4.

The rear windows 41 on each side of the car are fixed and in this case a felt-lined channel section member 42 is arranged to extend between the vertical members 9 and 10 just above the intermediate side members 22 and 24, to form the lower member of the frame to hold the window which consists of a plain piece of glass. The three other windows 42ᵃ in the car body as distinct from the door are all arranged to slide downwardly in the channel members 37, which in this case extend nearly to the lower end of the wooden strips 36 (see Figure 4). Dummy channel members 43 are arranged to extend across these windows just above the intermediate side members 22 and 25 to match in appearance from the outside, the lower frame members 42 of the rear windows. These members 43 consist of a strip of sheet metal having its upper edge bent over inwardly to grip a piece of felt 44, and secured in place, as shown in detail in Figure 11. In order to improve the appearance of the inside of the body, vertical and horizontal beading strips 45 and 46 are secured on and between the vertical strips 36, forming a uniform framework for the windows. This can be seen in Figure 4.

Extending across the body between the two front verticals 7, is the dashboard 48 secured to the outside of the frame. The vertical strips 36 on the two members 7 have their opposing parallel faces 49 (see Figure 6) provided with channel section frame members 50 to carry the fixed vertical windscreen 51. Upper and lower channel section frame members 52 and 53 are likewise provided, secured on transverse wooden members 54 and 55.

If required, an ordinary divided windscreen may be used, in which case the fixed channel section frame members 50, 52 and 53 would be dispensed with and the screen mounted in the well-known manner.

The opening between the vertical members 8 and 9 of one side of the body frame is closed by the door 57 (see Figures 3, 9 and 10). This door comprises a substantially rectangular framework of D section tubes, the side members 58 of which are curved at their lower ends to conform to the curvature of the lower part of the car body. The top and bottom members 59 are secured to the side members 58 by trapping and welding in the same way as the various joints of the body frame, as is also secured an intermediate transverse member 60 between the members 58 at the level of the longitudinal members 24 and 25 of the body frame.

The lower part of the door frame is closed by means of a sheet metal panel 61 and wooden strips 62 are secured to the flat inner faces of the side frame members 58, carrying felt lined channel members 63 in which a window 64 closing the upper part of the door frame is adapted to slide. These wooden strips 62 extend from top to bottom of the members 58 and transverse wooden strips 65 and 66 are secured to the flat inner faces of the top and bottom members 59 respectively. The upper strip 65 carries a felt-lined channel member 66 on its lower face to receive the upper edge of the window 64. A dummy channel member 67 similar to 43 is secured to the intermediate transverse frame member 60 exactly as the member 43 is secured to the body frame member 22.

The door 57 is hingedly mounted on the body frame by means of the hinges 68, the two parts of each of which are welded to the body frame member 8 and the forward side frame member 58 of the door, respectively. The forward and rear faces respectively of the forward and rear wooden strips 62 secured to the side frame members 58 of the door, are recessed at 69 so as to seat against projecting portions 70 of the wooden strips 36 secured to the vertical members 8 and 9 of the body frame, in the closed position of the door. The strips 36 on these two verticals are arranged to extend right down to the floor boards 82 which are supported on the base frame 1. The edges of the floor boards 82 situated across the opening for the door 57 are shaped to form a seating for the lower transverse wooden strips 66 on the door in the closed position thereof, as shown in Figure 10.

Extending across the inside of the rear intermediate horizontal member 23 and forwardly to the rear vertical member 10 is the wooden strip 76. In order to make a weather tight joint between the strip 76 and member 23 a weather strip 95 of leather or like material may be placed between them, as shown in Figure 8. To the inside of this strip are secured the lower ends of the vertical rear portions of the two outer roof members 19 and 21, as shown in Figure 8. This upper portion of the body, at the rear of the member 10, is provided with a covering of shaped sheet metal plates 77 disposed upon the outside of the frame members and having their lower edges secured to the outside of the wooden member 76. This rear portion is provided with a central window 80. Similarly, the curved portions of the body between the upper longitudinal side members 35 and the longitudinal roof members 19 and 21 are provided with a covering of shaped sheet metal plates 78 (see Figure 10) from front to rear of the body. The remainder of the roof of the body is provided with a covering 79 of leather, fabric or the like material in the usual way.

The inside of the metal plates 30 are preferably covered with an upholstering material, and the inside of the roof with fabric or other material.

If desired, in conjunction with this form of body, separate or loose seats of the form described in British specification No. 205,151 may be used.

Although I have herein described my invention as being applied to vehicles for carrying passengers, I wish it to be understood that the invention is equally applicable to other vehicles.

What I claim then is:—

In a vehicle body, a frame comprising a plurality of longitudinal tubular members of D section and a plurality of transverse tubular members of D section, all of said members having their flat sides disposed inwardly, said members being arranged in intersecting relationship and connected together at their points of intersection, one member of each intersecting pair being trapped to provide a recess of a depth to allow the other member of the pair to lie therein whereby the flat sides of all the tubes lie flush.

In witness whereof I affix my signature.

HENRY ARTHUR LAMPLUGH.